US012744847B2

(12) United States Patent
Meersma

(10) Patent No.: US 12,744,847 B2
(45) Date of Patent: Sep. 22, 2026

(54) SYSTEM FOR REQUESTING EMERGENCY SERVICE IN AN ONLINE COLLABORATION CONTEXT

(71) Applicant: Microsoft Technology Licensing, LLC, Redmond, WA (US)

(72) Inventor: Brian Daniel Meersma, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 329 days.

(21) Appl. No.: 18/054,728

(22) Filed: Nov. 11, 2022

(65) Prior Publication Data

US 2024/0163371 A1 May 16, 2024

(51) Int. Cl.
*H04M 3/51* (2006.01)
*H04M 3/56* (2006.01)

(52) U.S. Cl.
CPC ......... *H04M 3/5116* (2013.01); *H04M 3/567* (2013.01)

(58) Field of Classification Search
CPC ............................ H04M 3/5116; H04M 3/567
USPC ....................................................... 455/404.1
See application file for complete search history.

(56) References Cited

U.S. PATENT DOCUMENTS

2014/0368601 A1* 12/2014 deCharms ............. H04N 7/148 348/14.02
2019/0174289 A1* 6/2019 Martin ................ H04M 3/5141
2021/0057112 A1* 2/2021 Mansi ................. G06F 16/9017
2023/0137028 A1* 5/2023 Anderson ............ H04M 3/5116 379/45

* cited by examiner

*Primary Examiner* — Maria El-Zoobi

(57) ABSTRACT

Technology disclosed herein includes a method of operating a communication service. The method includes hosting a conference call comprising bidirectional communications between at least a first endpoint and a second endpoint; receiving, in the context of the conference call, a request from the first endpoint for emergency service on behalf of a user at the second endpoint, wherein the request is initiated by user input received at a user interface on the first endpoint; and establishing a connection between the second endpoint and a public safety access point to obtain the emergency service for the user.

21 Claims, 11 Drawing Sheets

200

300

800

900

SYSTEM FOR REQUESTING EMERGENCY SERVICE IN AN ONLINE COLLABORATION CONTEXT

TECHNICAL FIELD

Aspects of the disclosure are related to a system for requesting emergency service in the context of an online communication service.

BACKGROUND

Online communication services such as Microsoft Teams®, Zoom®, and Webex® are popular means of hosting videoconferences which allow multiple parties who may be remote from each other to collaborate. In addition to hosting videoconferences, online communication services provide the ability to make telephone calls, including 911 calls. An online communication service may offer telephonic services via a system integrator that bridges the communication service to publicly switched telephone networks (PSTNs).

Generally, when a 911 call is placed from a cellphone or landline, the call is routed to a public safety access point (PSAP) corresponding to the location of the caller. With 911 calling through an online communication service, the system integrator bridges the online communication service to a PSTN to establish a connection with the PSAP corresponding to the location of the online caller. In the online context, the location of the online caller is provided by the communication service or a client of the service. Thus, a user of a communications service can call 911 from the user interface of the client executing on a desktop or laptop computer just as if the participant is making the call from a landline or cellphone.

Suppose, however, a participant in a videoconference call witnesses another participant in the session in distress and requiring emergency intervention. If the distressed participant is unconscious or is otherwise incapacitated (e.g., suffering a stroke or a heart attack), the distressed participant may be unable to request emergency assistance for himself or herself. Another participant on the call may wish to request emergency assistance on behalf of the distressed person.

OVERVIEW

Technology is disclosed herein for operating a communication service which hosts a conference call among multiple endpoints. The conference call includes bidirectional communications between at least a first endpoint and second endpoint. The method includes receiving, in the context of the conference call, a request from the first endpoint for emergency service on behalf of a user at the second endpoint. The request is initiated via user input at a user interface on the first endpoint. The method further includes establishing a connection between the second endpoint and a PSAP.

In an implementation, the method includes establishing the connection between the second endpoint and the PSAP by directing the second endpoint to call the PSAP. In some implementations, the communication service establishes a connection to the PSAP when a timer on a notification on the second endpoint expires, the notification indicating that the request for emergency service has been initiated. In still other implementations, the method includes adding the PSAP to the conference call.

A computing device is disclosed herein which executes collaboration application. The collaboration application includes program instructions which direct the computing device to join a conference call hosted by a communication service. The computing device exchanges bidirectional communications with one or more other endpoints on the conference call. The computing device receives user input via a user interface of the collaboration application which is indicative of an instruction to request emergency service on behalf of a user at one of the endpoints. In response to the user input, the computing device sends a request for emergency service at the other endpoint.

In an implementation, the program instructions direct the computing device to place an emergency call to the PSAP using a location of the second endpoint. In some implementations, the emergency call is joined to the conference call.

Also disclosed herein are program instructions stored on computer-readable storage media which direct a computing apparatus to join a conference call via a user interface of a collaboration application. The conference call is hosted by a communication service and includes bidirectional communications with one or more endpoints on the conference call. In the user interface, the computing apparatus receives a notification of a request for emergency service at a location of the computing apparatus. The program instructions further direct the computing apparatus to initiate a process to connect to a PSAP.

In an implementation, initiating the process to connect to the PSAP includes the computing apparatus setting a timer and initiating the process when the timer expires. In an implementation, initiating the process to connect to the PSAP includes the computing apparatus placing an emergency call. In some implementations, the initiating the process to connect to the PSAP includes the computing apparatus acknowledging the notification causing the communication service to place an emergency call.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1A:
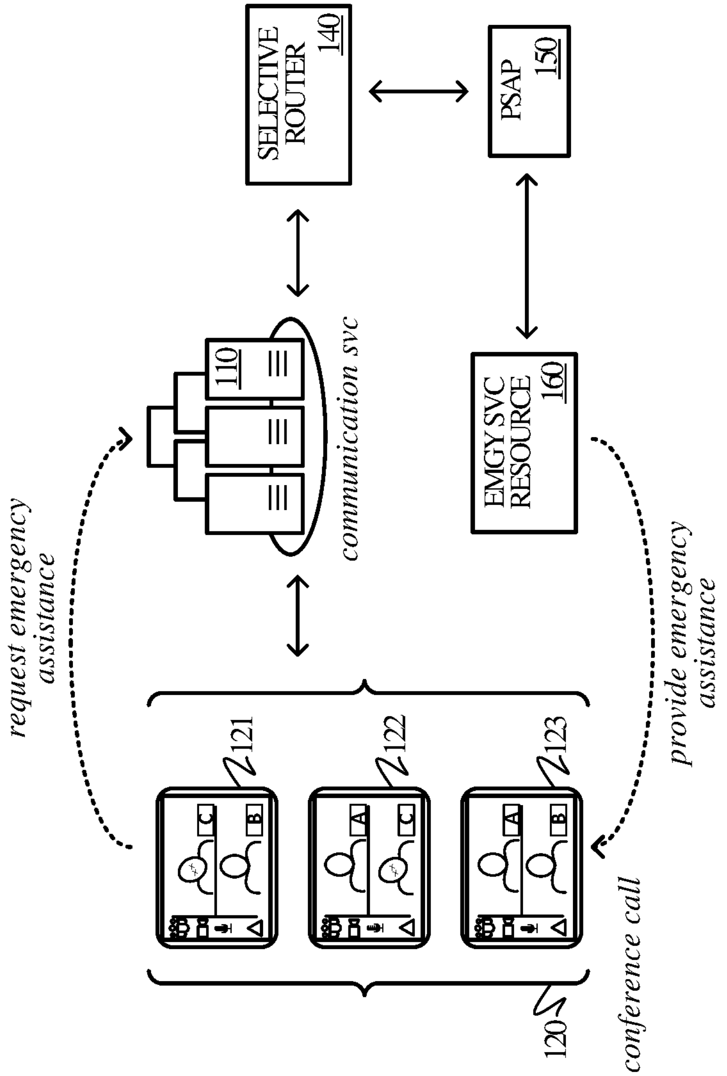
FIG. 1A illustrates an operational architecture in an implementation.

Various implementations are disclosed herein for requesting emergency service on behalf of a participant in an online conference call (i.e., videoconference). In an implementation, a communication service hosts a conference call among multiple users, each at an endpoint, i.e., a computing device executing a client communication application. During the conference call, it may become apparent to one user that another party to the call is in distress, e.g., in medical distress, and requires or appears to require immediate emergency assistance. The user sends a request for emergency service on behalf of the distressed party to the communication service through the user interface of the communication application.

In various implementations, an endpoint of the conference call executes a client communication application of the communication service, such as a web-based application or native application. Examples of a communication services capable of hosting online conference calls or videoconferences include Microsoft Teams®, Zoom®, Webex®, Skype®, and Google Meet®. The user interface of the communication application displays the conference call hosted by the communication service. The conference call includes multiple participants who may be remote from each other. The user interface at each endpoint of the individual participants provides bidirectional audio and video communication with the other participants. The user interface of the collaboration application displays the real-time video feeds provided by cameras on the participants' computing devices. The user interface also displays a graphical user input device (e.g., a graphical button) by which a first participant can initiate an emergency response procedure by the communication service for a second participant from the user interface of the first participant's endpoint.

In response to the request for emergency service on behalf of the distressed party, the communication service implements an emergency response procedure. In an implementation, the emergency response procedure includes notifying the distressed party of the request for emergency service. The notification may include an option for the distressed party to cancel the request, such as an option to cancel which expires after a set period of time from receiving the notification. For example, the user interface of the collaboration application of the distressed party displays a timer which counts down ten seconds to cancel the request.

If the distressed party fails to cancel the request (i.e., because the individual is unconscious), the communication service continues the emergency response procedure by connecting to a public safety access point (PSAP) via a selective router, sometimes referred to as a "911 selective router." The selective router routes the call from the communication service to the PSAP of a network of PSAPs according to the location of the distressed party's computing device provided by the communication service. The PSAP in turn connects the communication service to an emergency dispatcher in the distressed party's jurisdiction. For example, communication service 110 receives a request for emergency service from a call participant at an endpoint in Denver on behalf of a distressed call participant in Atlanta, and the selective router will route the request to a PSAP in Atlanta. From the PSAP in Atlanta, an emergency dispatcher in Atlanta may deploy an emergency response (e.g., paramedics) to the location of the distressed call participant.

In various implementations, the communication service maintains a database of the locations of the endpoints connected to the conference call. In the same or other implementations, the communication service uses location information obtained from a locator or mapping service executing on the endpoint's computing device, such as GPS coordinates of the user's mobile computing device or position data triangulated from cell towers of the user's mobile computing device. The communication service may also obtain location data from the service provider or IP address of the endpoint.

In an implementation, the communication service, having connected to a PSAP via the selective router, patches the emergency service resource, e.g., an emergency dispatcher, into the conference call so that the dispatcher can attempt to communicate with the distressed party or to assess the distressed party's situation. In some implementations, the communication service sequesters the distressed party to a virtual break-out session of the conference call for privacy and join the emergency service resource to the break-out session. The communication service may join another user to the break-out session, such as an emergency contact specified in account information or settings for the distressed party. This will allow other participants in the conference to be connected to the emergency call to provide background information about the events leading to the individual's distress.

In other implementations, the communication service determines endpoints which are proximate to the location of the distressed party, such as other users in the same building as the distressed party. The communication service may transmit an alert to the other, proximate endpoints indicating that a request for emergency service on behalf of the distressed party has been received, enabling other users to go to the distressed party to provide more immediate assistance. For example, the communication service displays an alert message in the user interfaces of the other endpoints. The other endpoints may be users participating in the conference call or users who are logged into the communication service but are not joined to the conference call.

In still other implementations, an artificial intelligence component ("AI") of the communication service is trained to detect the symptoms of emergent medical conditions of users which may trigger the communication system to notify other participants. For example, if the AI detects that a participant is exhibiting stroke symptoms based on the speech patterns of the participant, the communication service will display an alert on the endpoints of other participants. Upon receiving the alert, another participant can attempt to contact the user through the conference call or other means outside of the conference call to determine the user's condition and need for emergency care. The alert may also present the option for another participant to initiate the emergency response procedure. In an implementation, the emergency response procedure includes the communication service notifying the endpoint of the distressed party of the request for an emergency response at the distressed party's location, giving the distressed party the option to cancel the request in the event of a false alarm, and establishing a connection with an emergency service response if the distressed party fails to cancel the request or fails to cancel the request within a specified period of time.

Various technical effects may be appreciated from the technology disclosed herein. When a participant of a videoconference call wishes to summon an emergency response for another participant who is in distress and the participants are in different jurisdictions, for example, the concerned participant's emergency call would normally connect to the PSAP of that participant's own locality. And even assuming the caller is able to provide the location of the distressed person, the caller's PSAP may have to determine the emergency response authority or PSAP of the distressed person's location, then relay the information about the distressed person to that authority, consuming precious minutes in responding to the medical or other crisis. Moreover, if a participant attends the videoconference via a smartphone and makes an emergency call from the smartphone, the smartphone may cut off access to the videoconferencing application at a moment when such access is critically important to coordinating an emergency response for the distressed participant. Of course, if the concerned participant does not know the distressed person's location or address, he or she would be unable to relay that information to the PSAP, rendering any attempt to make an emergency call on behalf of the distressed participant fruitless. Thus, the disclosed technology enables a user to request an emergency response on behalf of another user without requiring any participant on the videoconference call to know the location of the person in distress.

FIG. 1A illustrates operational architecture 100 in an implementation. Operational architecture 100 includes communication service 110 hosting conference call 120 including users at multiple endpoints including endpoints 121, 122, and 123. The multiple endpoints execute a communication application in communication with communication service 110. Communication applications on the multiple endpoints display user interfaces. Communication service 110 is in communication with selective router 140 by which communication service 110 can connect to and communicate with PSAP 150. PSAP 150 is in communication with emergency service resource 160.

Figure 9:
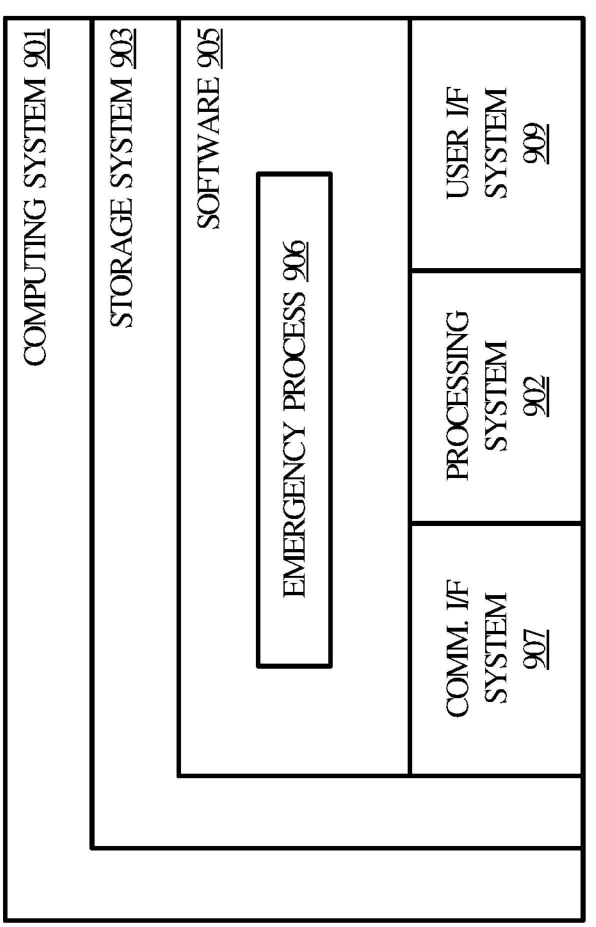
FIG. 9 illustrates a computing system suitable for implementing the various operational environments, architectures, processes, scenarios, and sequences discussed below with respect to the other Figures.
Figure 9:

Communication service 110 is representative of one or more computing services capable of interfacing with computing devices such as endpoints 121, 122, and 123. Communication service 110 comprises services capable of interfacing with endpoints 121, 122, and 123 over one or more wired or wireless communication networks. In an implementation, communication service 110 includes various subprocesses or subservices such as hosting conference calls, videoconferences, or collaboration sessions with two-way communications among multiple users. Communication service 110 may also provide other subprocesses or subservices including location services, emergency response coordination, and the like. Communication service 110 may be implemented in the context of one or more server computers co-located or distributed across one or more data centers. Examples of such servers include web servers, application servers, virtual or physical (bare metal) servers, or any combination or variation thereof, of which computing device 901 in FIG. 9 is broadly representative.

Endpoints 121, 122, and 123 are representative of computing devices, such as laptops or desktop computers, or mobile computing devices, such as tablet computers or cellular phones, capable of communicating with communication service 110 over one or more wired or wireless communication networks. Endpoints 121, 122, and 123 each execute a client communication application for videoconferencing. The communication application displays a user interface on the endpoint and communicates with communication service 110, such as sending user input from the user interface to communication service 110. Endpoints 121, 122, and 123 communicate with communication service 110 via one or more internets and intranets, the Internet, wired and wireless networks, local area networks (LANs), wide area networks (WANs), and any other type of network or combination thereof.

User interfaces of endpoints 121, 122, and 123 enable their respective users to exchange audio and video communication with other users, i.e., to facilitate bidirectional communication, in the context of a conference call, videoconference, or other online collaboration session. The user interfaces can include graphical representations of user input devices such as buttons, text boxes, and sliders by which a user can control the transmission of his or her live video and/or audio feed. User input devices also include a graphical button or other input device by which a user can request emergency service on behalf of another user.

Selective router 140 is representative of a service which routes of incoming emergency calls to the appropriate PSAP according to the location of the call source or emergency. Selective router 140 is in communication with or includes a location or route database (not shown) used by selective router 140 to route an emergency call to the correct PSAP for the distressed user's jurisdiction. The location database can include a selective router database, an ALI (automatic location identification) database, and/or an MSAG (master street address guide) database. The location database identifies, for a given location, the PSAP of a network of PSAPs to which an emergency call should be routed. In this exemplary implementation, selective router 140 routes the emergency call or connection from communication service 110 to PSAP 150 as indicated by the location database.

A connection from communication service 110 is routed to PSAP 150 by selective router 140 according to the location of the distressed party identified by communication service 110. PSAP 150 is representative of a public safety access point or answering point, such as a call center, which is staffed by emergency dispatchers who coordinate an emergency response by emergency service resource 160. Emergency service resource 160 is representative of a service capable of responding to an emergency, e.g., police, fire, medical (e.g., paramedics), or other first responders in the area or jurisdiction of an endpoint.

In operation, communication service 110 hosts a videoconference between at least users at endpoints 121, 122, and 123. In the videoconference, there is bidirectional audio and video transmission for communication between all participants. A user at endpoint 121 is able to communicate with, for example, users at endpoints 122 and 123 via a user interface displayed on endpoint 121. Similarly, the users at endpoints 122 and 123 participate in the videoconference via the user interfaces of the communication applications executing on those endpoints.

In an implementation, during the videoconference, the user at endpoint 121 ("user A") determines that the user at endpoint 123 ("user C") appears to require immediate emergency intervention. For example, the user at endpoint 123 may suffer a sudden medical crisis, such as a stroke, heart attack, or airway obstruction. The user at endpoint 121 clicks or selects a graphical user input device in the user interface of the communication application which causes the communication application to transmit a request to communication service 110 to initiate an emergency response protocol for the user at endpoint 123.

Continuing with the emergency response protocol, communication service 110 transmits a notification to the user interface of endpoint 123 indicating that a request for emergency service has been made by another participant of the videoconference. The notification may surface a notification window in the user interface informing the user of the request for emergency service and providing the user at endpoint 123 with the option to cancel the request, such as in the event of a false alarm or if emergency assistance has already been summoned. The option to cancel the request may be set to expire after a set period of time elapses, for example, after ten seconds, at which time communication service 110 proceeds with establishing contact with the PSAP for the location of endpoint 123 (in this example, PSAP 150). The notification displayed on endpoint 123 may also include audible alerts to capture the attention of the user at endpoint 123 or of another person who may be in the vicinity of endpoint 123. In various implementations, communication service 110 also provides information in the user interface of endpoint 121 regarding the status of the emergency response procedure.

When communication service 110 receives the request for emergency service from endpoint 121 on behalf of user C at endpoint 123, communication service 110 executes a location service to ascertain the location of endpoint 123. In an implementation, the location service identifies the location of endpoint 123 by referring to known location information corresponding to the user's account, such as in a location database, from a mapping service or location service executing onboard endpoint 123, or based on the IP address of endpoint 123. For example, if endpoint 123 is a mobile device, such as a smartphone or tablet computer, GPS (Global Positioning System) coordinates of the device may be obtained by location or mapping services executing onboard the device. Using the location information of endpoint 123, communication service 110 establishes contact with selective router 140 which determines the PSAP for the jurisdiction of endpoint 123 (represented by PSAP 150) for connecting to the appropriate emergency dispatcher.

If/when user C at endpoint 123 does not respond to the notification (i.e., does not cancel the request), communication service 110 establishes a connection with PSAP 150 via selective router 140. Communication service 110 provides the location determined by the location module or service to PSAP 150. In various implementations, communication service 110 connects to an emergency dispatcher at PSAP 150 and joins the emergency dispatcher to the videoconference. Communication service 110 may move or join the distressed user's virtual presence to a break-out session of the videoconference for privacy and join the emergency dispatcher to the break-out session. The emergency dispatcher can assess the status of the user at endpoint 123 and deploy first responders to the user's location if necessary. Communication service 110 may also join the requesting user at endpoint 121 to the break-out session as necessary.

In some implementations, endpoint 123 establishes contact with a PSAP when the notification timer expires. For example, endpoint 123 places an emergency call which is routed by selective router 140 to PSAP 150. In various implementations, an emergency call is placed by dialing "9-1-1," but it may be appreciated that emergency call dialing can vary according to jurisdiction or location (e.g., "9-9-9" or "9-9-1-1").

In some implementations, communication service 110 uses the location information of endpoint 123 to notify other participants or users in the vicinity of endpoint 123 of the emergency. For example, if endpoint 123 is at a workplace, communication service 110 will transmit an alert to other participants of the videoconference or to other users logged into communication service 110 but not in the videoconference to facilitate on-sight assistance for the distressed user. In still other implementations, communication service 110 causes the client application at endpoint 123 to generate an audible alert to capture the attention of persons nearby. For example, the client application may read the alert message aloud or sound an alert signal to capture the attention of or rouse the distressed user or to draw the attention of another person who may be nearby.

In still other implementations, communication service 110 executes an artificial intelligence module capable of detecting the onset of an emergent situation. For example, the AI module may detect from a user's speech patterns the possible onset of a stroke. In other implementations, the AI module may detect symptoms of other pathologies from, for example, a user's breathing pattern, skin tone, or other indication. Upon detecting an emergent situation, communication service 110 alerts the affected user and/or other users in the videoconference to assess the need for an emergency response procedure on behalf of the affected user.

Figure 1B:
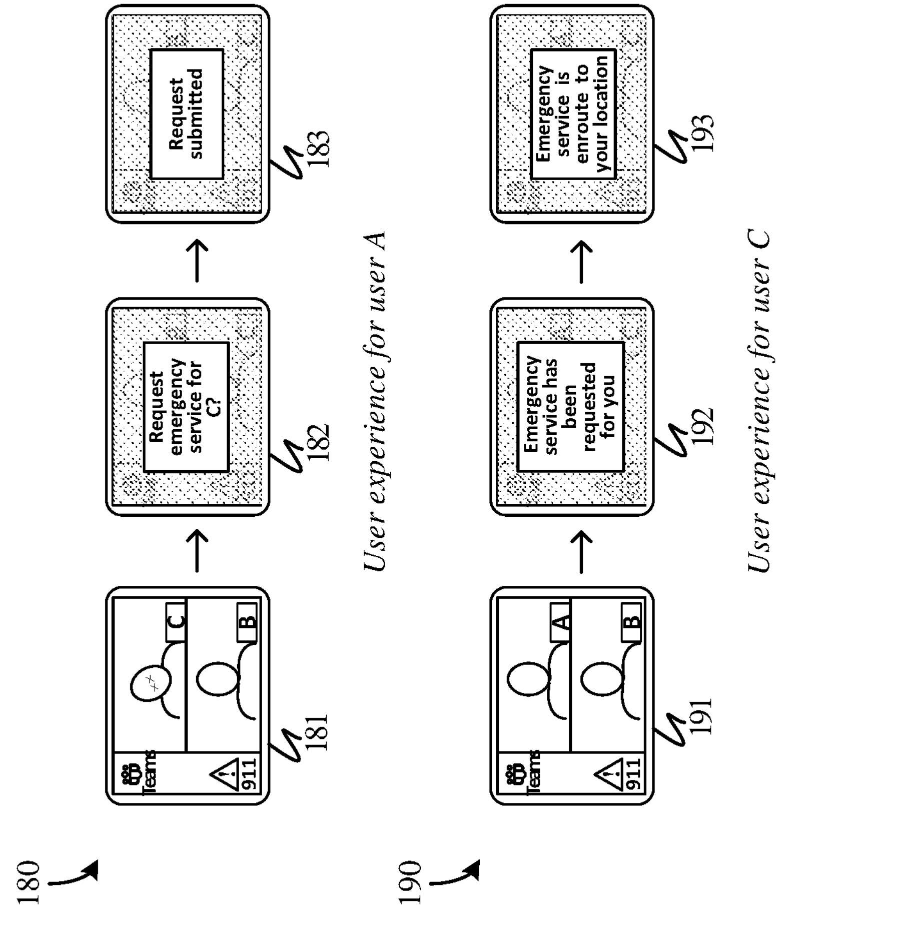
FIG. 1B illustrates an operational scenario of a communication service in an implementation.

FIG. 1B illustrates sequence 180 of views of the user experience of user A at endpoint 121 who is requesting emergency service on behalf of user C. FIG. 1B also illustrates sequence 190 of views of the user experience of user C at endpoint 123 who is the distressed participant in conference call 120.

In view 181, user A witnesses user C in some type of distress and appearing to require immediate medical assistance. User A clicks or selects the "911" button at the lower left corner of the user interface to request emergency service on behalf of user C. In view 182, user A confirms the request, subsequent to which the client application transmits the request to communication service 110. When communication service 110 receives the request, communication service 110 enacts an emergency response procedure for user C.

View 191 of sequence 190 illustrates the user interface as seen by user C. In view 192, subsequent to user A submitting the request for emergency service on behalf of user C, a notification is displayed advising user C of the request. When user C fails to respond to the notification, communication service 110 establishes contact with emergency service resource 160 and provides the location of endpoint 123. In some implementations, when user C fails to respond to the notification, endpoint 123 places an emergency call to establish contact with emergency service resource 160. In view 193, another notification is displayed indicating that emergency service is enroute to the location of endpoint 123.

Figure 2:
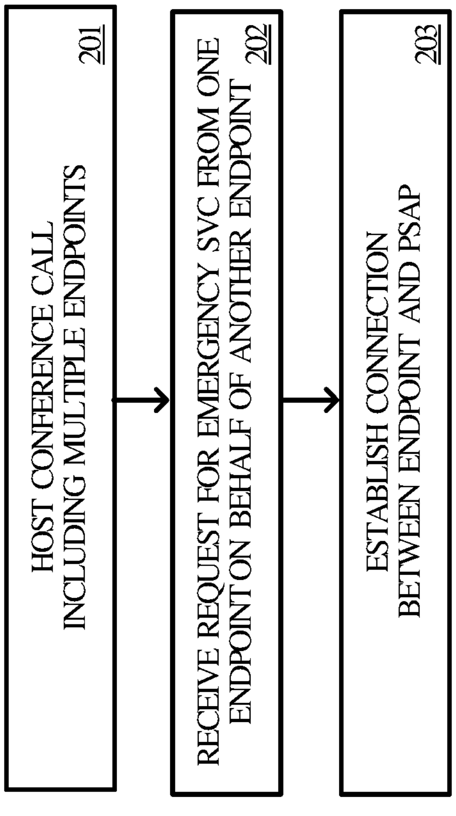
FIG. 2 illustrates a method of operating a communication service for a conference call in an implementation.

FIG. 2 illustrates emergency response process 200 in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

In an implementation, a communication service hosts a conference call or videoconference between multiple participants (step 201). Each participant attends the collaboration via an endpoint executing a communication application in communication with the communication service. The communication application may be a client application of the communication service, such as a native application or a web-based application. The client application displays a user interface on the endpoint enabling two-way audio and video transmission. The user interface includes graphical user input devices by which a user can use various functions of the communication service, such as enabling or disabling the audio or video feed, screensharing, joining chat sessions or break-out sessions, text messaging, or requesting an emergency response.

In an exemplary implementation, a participant of the conference call requests emergency service for another participant via the user interface of his or her communication application (step 202). For example, the requesting participant may detect that the other participant is in distress or has become incapacitated. The requesting participant makes the request by clicking or selecting a graphical user input device, such as a graphical button, for requesting emergency service. In an implementation, upon selecting the button for emergency service, the user interface presents a menu for selecting the user or endpoint for which emergency service is being requested. The requesting participant selects the appropriate user or endpoint, and the communication application transmits the request to the communication service.

Upon receiving the request for emergency service for the distressed participant, the communication service notifies the distressed participant of the request for emergency service made on his or her behalf and determines a location of the endpoint of the distressed participant. The notification may be a pop-up in the user interface of the endpoint with a message indicating the action taken and which provides the user with the opportunity to cancel the request within a specified amount of time. If the distressed participant fails to cancel the request (thereby confirming a need for emergency assistance), the communication service establishes a connection between the appropriate PSAP, e.g., an emergency dispatcher, and the endpoint of the distressed participant (step 203). In an implementation, the communication service patches the emergency dispatcher of the PSAP into the conference call. In the conference call, the emergency dispatcher can attempt to communicate with the distressed user or to assess his or her status. The emergency dispatcher may also be able to communicate with or provide instructions to other persons at the endpoint to provide assistance to the distressed participant. In establishing the connection between the emergency dispatcher and the endpoint, the communication service also provides the location information determined for the endpoint so first responders can be dispatched to that location.

Figure 3:
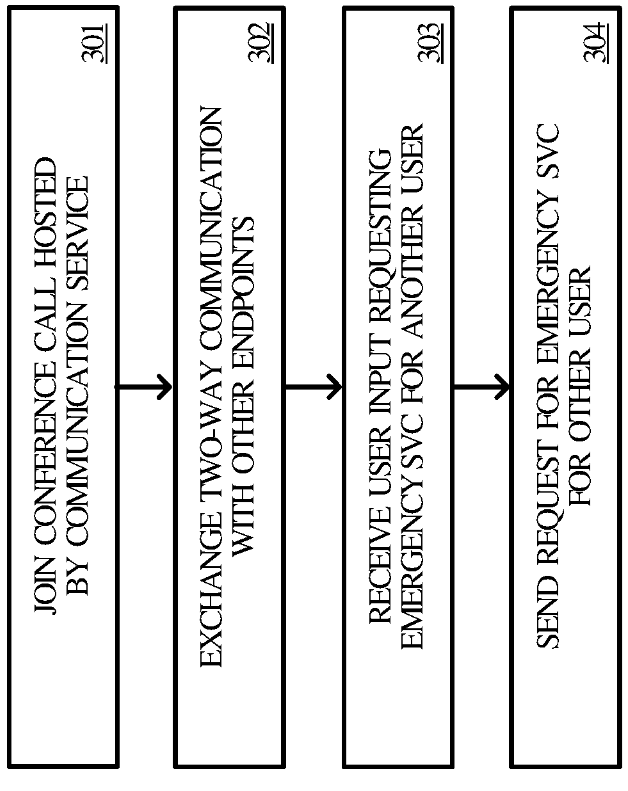
FIG. 3 illustrates a method of operating an endpoint of a conference call in an implementation.

FIG. 3 illustrates emergency response process 300 in an implementation, herein referred to as process 300. Process 300 may be implemented in program instructions in the context of any of the software applications, modules, components, or other such elements of one or more computing devices. The program instructions direct the computing device(s) to operate as follows, referred to in the singular for the sake of clarity.

In an implementation, a communication application executing on an endpoint or computing device joins a conference call hosted by a communication service (step 301). The conference call includes multiple users, each at a computing device executing a communication application and interacting by means of two-way audio and video transmission (step 302). In the conference call, the multiple users may be in a variety of locations around the world, and the exact location of each user may be unknown to the other users.

In an implementation, the communication application displays a user interface on the computing device including a graphical user interface input device for initiating a request for emergency service on behalf of another user. A user or participant in the conference call may determine that another user is in a situation which requires immediate medical or other intervention. The user witnessing the situation provides user input via the user interface to request emergency service for the user in distress. The client application receives the user input (step 303) and sends information indicative of the request to the communication service (step 304).

In various implementations, the user interface of the requesting participant receives a status update of the request, such as indication that an emergency response procedure has been initiated, that the distressed participant has canceled the request, or if an emergency service resource in the locality of the distressed participant has been contacted. The communication service may also prompt the requesting participant to join a break-out session of the conference call with the distressed participant. In the same or other implementations, the user interface also provides the requesting participant with the option to cancel the request, for example, if the distressed participant is able to indicate that the request is not needed or if an emergency response is already underway.

Figure 4:
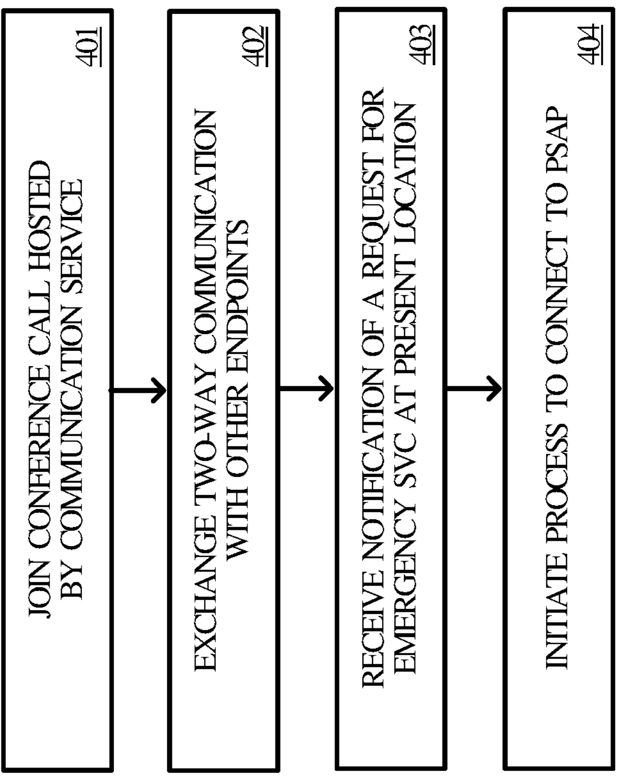
FIG. 4 illustrates a method of operating an endpoint of a conference call in an implementation.
Figure 4:

FIG. 4 illustrates emergency response process 400 in an implementation, herein referred to as process 400. Process 400 may be implemented in program instructions in the context of any of the software applications, modules, components, or other such elements of one or more computing devices. The program instructions direct the computing device(s) to operate as follows, referred to in the singular for the sake of clarity.

In an implementation, a communication application executing on an endpoint or computing device joins a collaboration session hosted by a communication service (step 401). The conference call or videoconference includes multiple users, each at a computing device executing a communication application and interacting by means of two-way audio and video transmission (step 402). In a conference call, the multiple users may be in a variety of locations around the world, and the exact location of each user may be unknown to the other users.

During the conference call, the user interface of the communication application surfaces a notification, such as a pop-up window, indicating that another participant of the conference call has requested emergency service on the user's behalf (step 403). For example, the other participant sees that the user is suffering a sudden medical crisis, and the other participant has made the request for emergency assistance via the participant's communication application as illustrated in process 300. In an implementation, the notification of the request received by the endpoint of the distressed user includes an option for the user to cancel the request, for example, if the request was made in error (e.g., a false alarm). The notification may provide a limited amount of time for the user to cancel the request so that if the user is incapacitated, the request will be carried forward to the appropriate emergency service dispatcher or resource, along with the location of the user's computing device for an on-sight response. The notification may also include an audible version of the notification (e.g., a text-to-speech reading of the notification message). In various implementations, the communication service also causes the communication application to sound an audible alert to attract other persons in the vicinity of the user to provide assistance.

If/when the distressed user fails to cancel the request within the specified period (step 430), the communication application initiates a process to connect with a PSAP (step 404). In an implementation, the communication application sends to the communication service an indication that the option has expired and the request was not cancelled. When the communication service receives the indication that the request was not cancelled, the communication service proceeds with establishing contact with a PSAP selected by a selective router.

In an implementation, subsequent to connecting with an emergency dispatcher, the communication service moves or joins the distressed user's virtual presence into a break-out session of the conference call and join the emergency dispatcher of the PSAP or a responder associated with an emergency service resource to the break-out session for a private consultation.

In other implementations, when the option expires, the communication application places an emergency call which is routed according to the location of the computing device to the appropriate PSAP.

Referring back to FIGS. 1A and 1B, the following is a brief example of processes 200, 300, and 400 with respect to operational architecture 100. Communication service 110 hosts conference call 120 for multiple users including users at endpoints 121, 122, and 123. Users at endpoints 121, 122, and 123 participate in conference call 120 via a client application in communication with communication service 110. Conference call 120 includes two-way audio and video transmission between the participants displayed in user interfaces of the client applications. The user interfaces include graphical user input devices by which users can enable or disable a number of functions and features associated with conference call 120. For example, a user can enable or disable the camera or microphone of his or her endpoint (computing device) during the conference call, screenshare, share files, join a break-out session, exchanges text messages with other participants, use a whiteboard feature, and so on. In addition, a participant can request in the user interface emergency service for another user if the participant believes that the other user needs immediate assistance, such as medical assistance in the event of a sudden medical crisis.

Continuing with the exemplary implementation, a user at endpoint 121 ("user A") determines that the user at endpoint 123 ("user C") is in immediate need of emergency assistance. For example, user A may observe from user C's live video feed in the user interface (view 181) that user C has become unresponsive. User A selects a graphical button in the user interface (view 181) to request emergency service and indicates that the emergency service is being requested for user C. User A confirms the request in view 182. The client application executing on endpoint 121 transmits the request to communication service 110 which initiates an emergency response procedure, as shown in view 183.

Communication service 110 initiates an emergency response procedure and determines a location for endpoint 123. In activating the emergency response procedure, communication service 110 sends a notification to endpoint 123 which is displayed in the user interface (view 192). The notification contains a message that another user in the conference call has requested emergency service on behalf of user C (view 192). In an implementation, the notification includes a mechanism, such as a graphical button, by which user C can cancel the request. The notification may also include a countdown timer at the end of which the option to cancel expires and communication service 110 proceeds with establishing contact with emergency service resource 160. When communication service 110 establishes contact with PSAP 150, PSAP 150 deploys paramedics to the location of endpoint 123 provided by communication service 110, which in turn sends another notification message to endpoint 123 that emergency response is enroute to that location (view 193).

Communication service 110 determines a location of endpoint 123 by referencing an address associated with user B's service account or user B's organization, by extracting position data from a location service executing onboard endpoint 123, or by other means according to an IP (Internet Protocol) or web address of endpoint 123. Communication service 110 connects with PSAP 150 selected by selective router 140 according to the location of endpoint 123. Communication service 110 submits the location of endpoint 123 to PSAP 150 in a request for emergency service at that location.

In some implementations, communication service 110 also transmits a notification of the request for emergency service to another user whose location is in the proximity of endpoint 123 and who is associated with endpoint 123. The other user may be a participant in conference call 120 or may be logged into communication service 110 but not participating in conference call 120. Communication service 110 may store and maintain a log of emergency contact information comprising individuals (e.g., a supervisor or colleague) or organizational contacts to be contacted in the event that an emergency service request is received.

In some implementations, communication service 110 adds PSAP 150 to conference call 120, for example, by joining PSAP 150 (i.e., a dispatcher at PSAP 150) and user C to a break-out session of conference call 120. Communication service 110 may also apprise user A of the status of the request, for example, by sending a notification to endpoint 121 that emergency service has been requested or that emergency service has received the request.

In some implementations, communication service 110 executes an AI module which is trained to detect symptoms of medical conditions the onset of which requires immediate medical attention. For example, the AI module may detect stroke symptomology from a user's speech patterns during a conference call.

Figure 5:
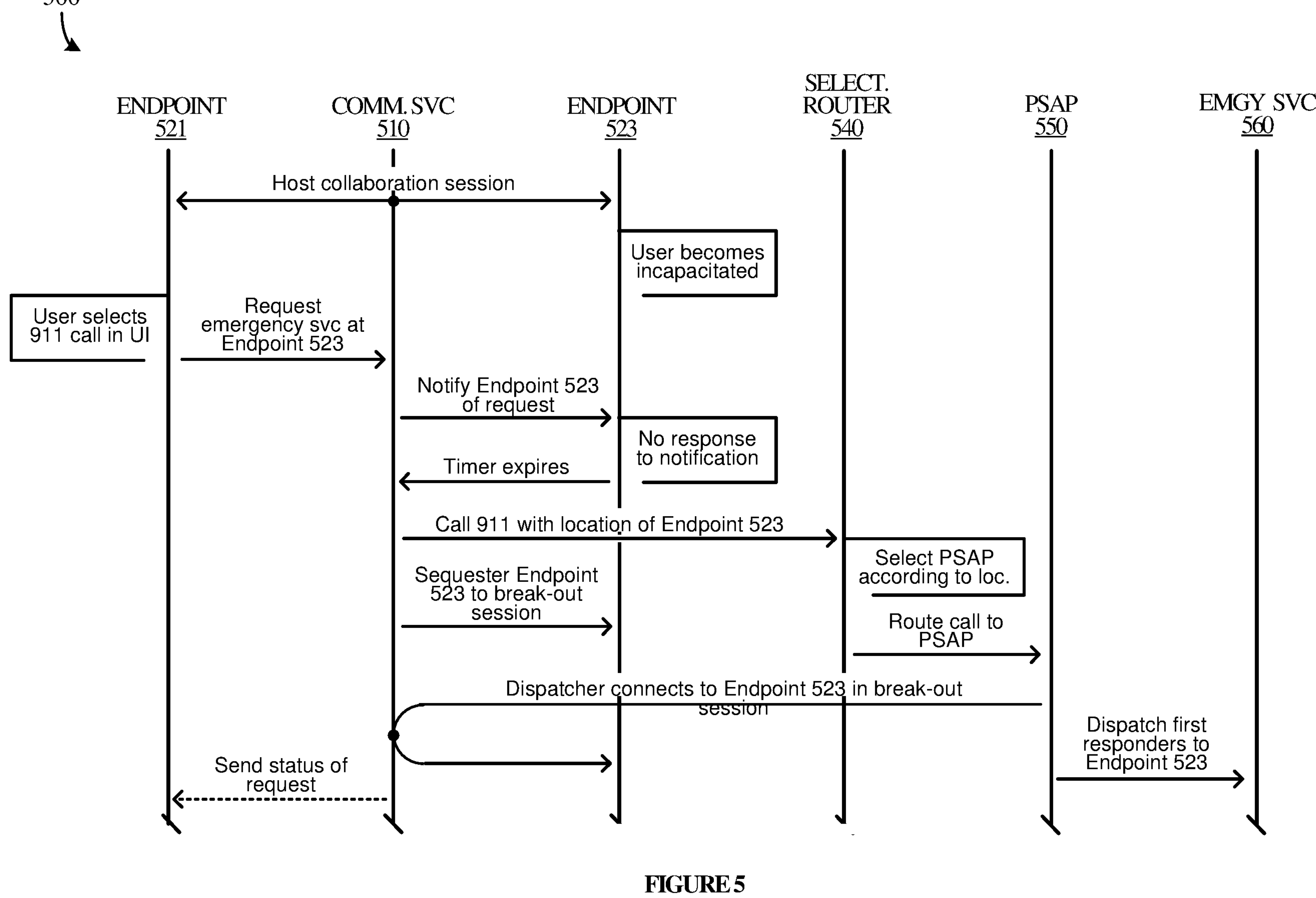
FIG. 5 illustrates an operational scenario of an emergency response system in an implementation.

FIG. 5 illustrates an operational scenario 500 in another implementation of the disclosed technology. Operational scenario 500 illustrates an implementation of an emergency service request procedure in the context of an online collaboration session hosted by communication service 510 between at least two endpoints 521 and 523. Endpoints 521 and 523 may be remote from each other, e.g., endpoint 521 may be in Denver while endpoint 523 may be in Atlanta, and the users may be unaware of the exact location of the other user.

In operational scenario 500, during the collaboration session, the user at endpoint 523 becomes incapacitated in some way and requires immediate intervention by first responders. The user at endpoint 521, upon determining that the user at endpoint 523 is in need of immediate assistance, submits a request for emergency service to communication service 510. The user at endpoint 521 submits the request via the user interface of the communication application which displaying the collaboration session.

Communication service 510 receives the request and sends to endpoint 523 a notification of the request. The notification includes a graphical mechanism by which the user at endpoint 523 can cancel the request. If/when the user at endpoint 523 does not respond to the notification within a specified period of time, communication service 510 contacts PSAP 550 which was selected by selective router 540 according to the location provided by communication service 510.

Continuing with the exemplary implementation of operational scenario 500 of FIG. 5, upon connecting with PSAP 550, communication service 510 patches PSAP 550 into the collaboration session so a dispatcher or operator associated with PSAP 550 can attempt to communicate with the user at endpoint 523. The dispatcher at PSAP 550 may deploy emergency service 560 (e.g., paramedics) to the location of endpoint 523 provided by communication service 510.

In various implementations, communication service 510 also provides PSAP 550 with a telephone number (e.g., mobile number) by which PSAP 550 can attempt to contact the user at endpoint 523.

In some implementations, upon establishing contact with PSAP 550, communication service 510 sends an alert notification to endpoint 521 (i.e., the endpoint of the requesting user) comprising a message displayed in the user interface at endpoint 521 which indicates the status of the request, such as the request has been forwarded to an emergency dispatcher, the request has been cancelled, etc.

Subsequent to contacting PSAP 550, in an implementation, communication service 510 sequesters the user at endpoint 523 to a break-out session of the collaboration session for privacy. Communication service 510 may also join PSAP 550 to the break-out session for assessment or consultation. In some implementations, communication service 510 may transmit to PSAP 550 a hyperlink or web address by which a dispatcher can access the break-out session via a web browser or communication application to assess the user's condition.

Figure 6:
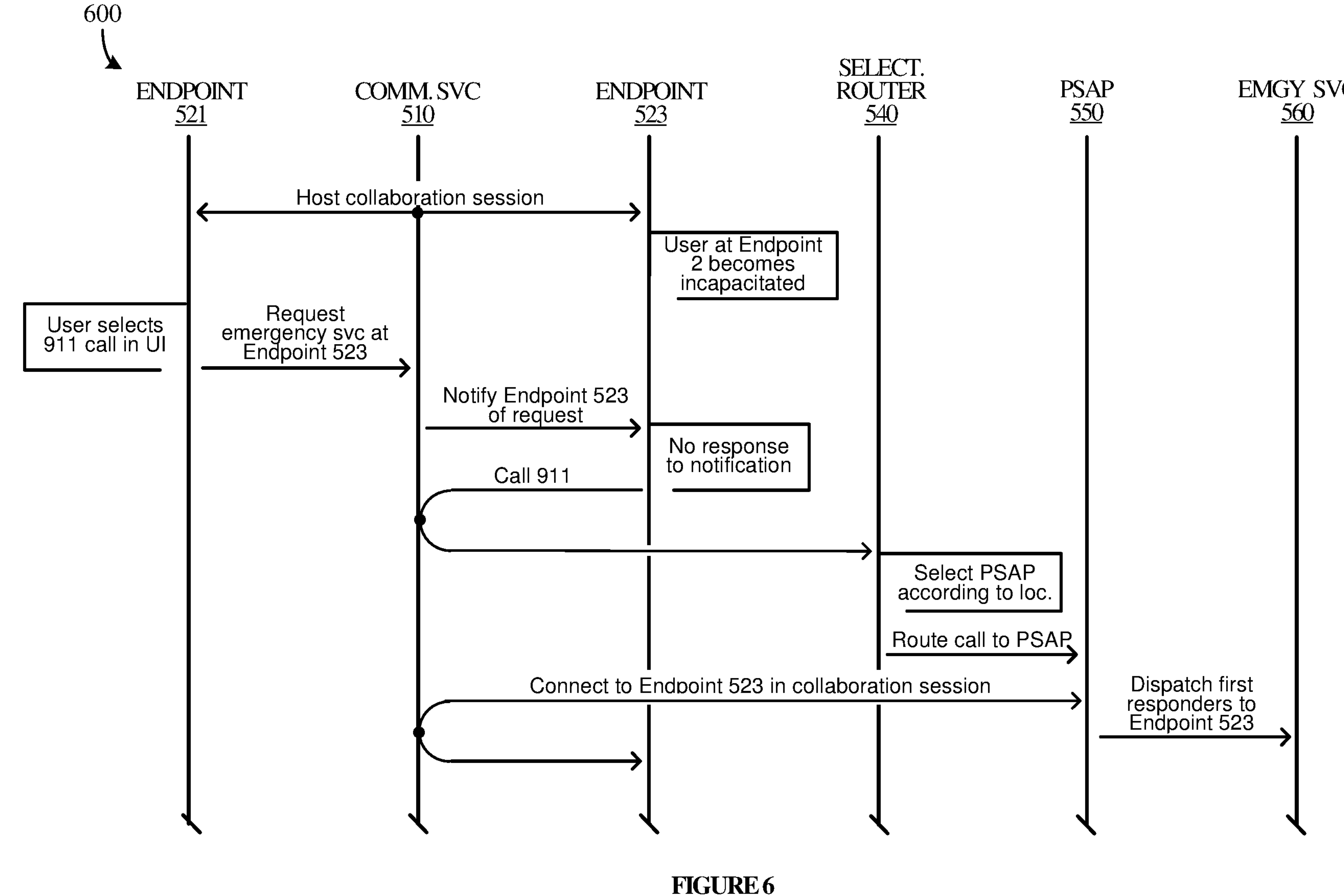
FIG. 6 illustrates an operational scenario of an emergency response system in an implementation.

FIG. 6 illustrates operational scenario 600 in an implementation. Similar to operational scenario 500, in operational scenario 600, when the user at endpoint 523 fails to respond to the notification from communication service 510, endpoint 523 places an emergency call to establish contact with an emergency dispatcher. The call from endpoint 523 is routed by selective router 540 to the appropriate PSAP (PSAP 550) which coordinates an emergency response involving emergency service 560. When contact is made with PSAP 550, the emergency dispatcher may deploy first responders to the location of endpoint 523 as provided by endpoint 523 in the call. PSAP 550 may also connect with endpoint 523 in the collaboration session via the client application executing on endpoint 523. Although the user at endpoint 523 may be unable to respond, the communication application executing at endpoint 523 may receive the call from PSAP 550 relayed by communication service 510 and patch it into the collaboration session.

Figure 7A:
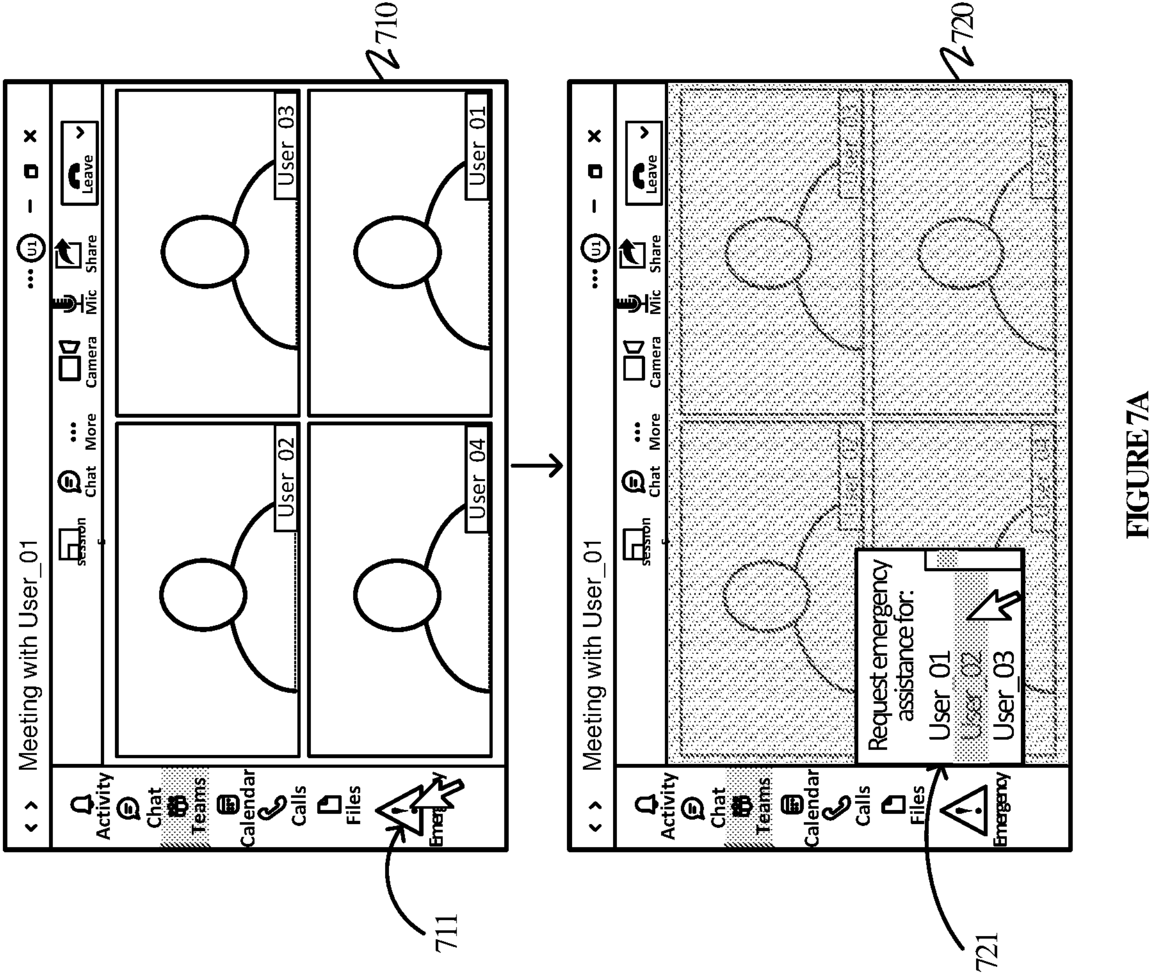
FIGS. 7A and 7B illustrate a user interface of an endpoint of a conference call in an implementation.
Figure 7A:
Figure 7B:
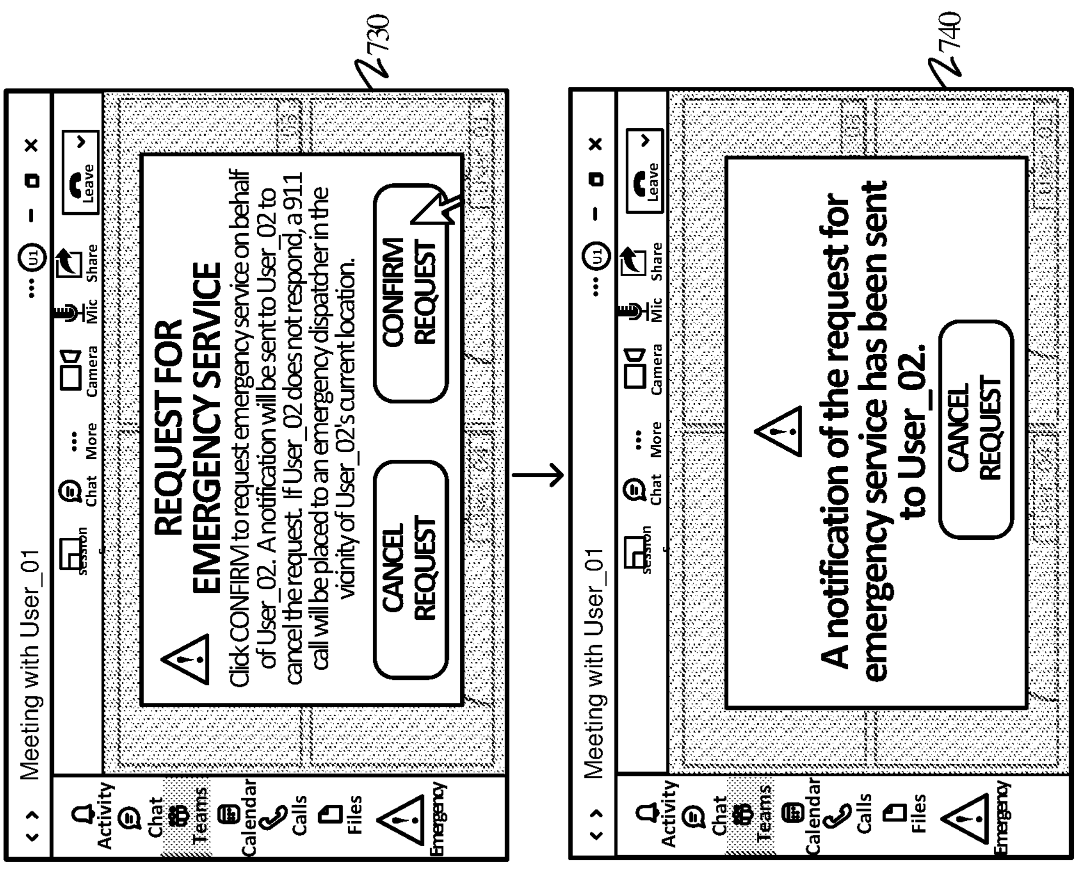

FIGS. 7A and 7B illustrate operational scenario 700 in an implementation of process 300. Operational scenario 700 includes a series of views of a user interface of a videoconferencing application which is executing on a participant's ("User_01's") endpoint or computing device.

In view 710, User_01 has set up a videoconference including at least three other users, User_02, User_03, and User_04. The videoconference is hosted by a communication service, of which communication service 110 is representative. The user interface in view 710 includes multiple features and services associated with videoconferencing, including graphical button 711 by which a user can summon emergency service assistance for another user. The application receives user input via the user interface, transmitting some user inputs to the communication service to act on.

In view 720, User_01 has selected or clicked on button 711 to initiate a request for emergency service on behalf of a participant in the videoconference. In an implementation, the user interface presents menu 721 by which User_01 can select emergency service for User_02. Next, the user interface in view 730 in FIG. 7B displays a confirmation screen where User_01 can confirm (or cancel) the request. When User_01 confirms the request, the application transmits the request to the communication service. In view 740, the user interface displays a status of the request along with a graphical button to cancel or withdraw the request.

Figure 8:
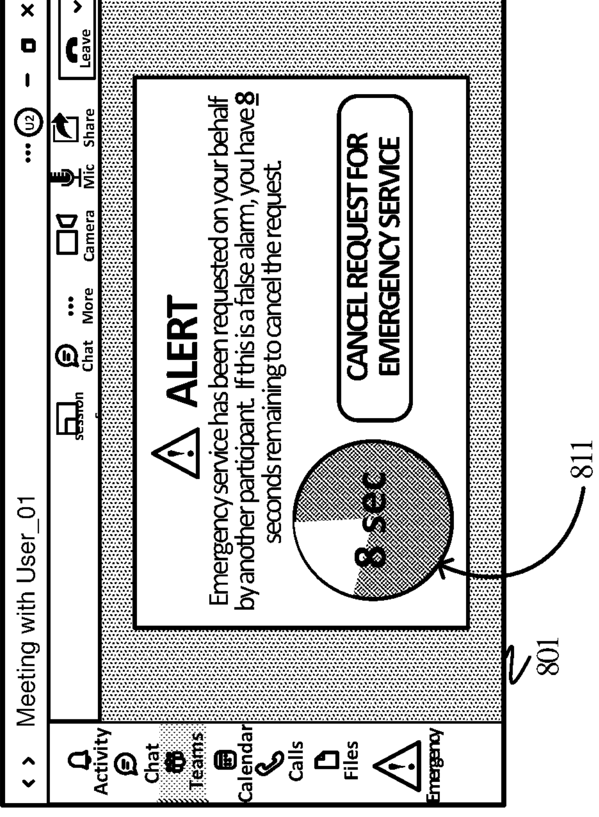
FIG. 8 illustrates a user interface of an endpoint of a conference call in an implementation.

Continuing the exemplary scenario illustrated in FIGS. 7A and 7B, FIG. 8 illustrates in view 801 a user interface of a videoconferencing application executing on User_02's endpoint or computing device in an implementation of process 400. In view 801, subsequent to User_01 submitting a request for emergency service on behalf of User_02, the user interface displays an alert screen by which User_02 is informed of the request and can cancel the request as appropriate. In an implementation, the alert screen includes timer 811 counting down a time until the option to cancel expires. For example, the alert screen may provide a ten-second window for the user to cancel the request. In some implementations, the user interface also sounds an audible signal to capture the user's attention. If the option to cancel expires (i.e., if User_02 fails to cancel the request), the communication service continues with the emergency response protocol by contacting an emergency service resource or provider in the jurisdiction of User_02's computing device.

FIG. 9 illustrates computing device 901 that is representative of any system or collection of systems in which the various processes, programs, services, and scenarios disclosed herein may be implemented. Examples of computing device 901 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements emergency process 906, which is (are) representative of the emergency processes discussed with respect to the preceding Figures, such as processes 200, 300, and 400. When executed by processing system 902, software 905 directs processing system 902 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including emergency process 906) may be implemented in program instructions and among other functions may, when executed by processing system 902, direct processing system 902 to operate as described with respect to the various operational scenarios, sequences, and processes illustrated herein. For example, software 905 may include program instructions for implementing an emergency process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to support an emergency process in an optimized manner. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a communication service comprising:

hosting a conference call comprising bidirectional communications between at least a first endpoint and a second endpoint;

receiving, in a context of the conference call, a request from the first endpoint for emergency service on behalf of a user at the second endpoint, wherein the request is initiated by user input received at a user interface on the first endpoint;

establishing a connection between the second endpoint and a public safety access point to obtain the emergency service for the user;

identifying another endpoint that is logged into the communication service and that is proximate to a location of the second endpoint; and sending an alert of the request for emergency service to the other endpoint.

2. The method of claim 1, wherein establishing the connection comprises directing the second endpoint to call the public safety access point.

3. The method of claim 1, wherein establishing the connection comprises connecting to the public safety access point when a timer on a notification on the second endpoint expires, wherein the notification comprises an indication that the request for emergency service has been initiated.

4. The method of claim 3, further comprising adding the public safety access point to the conference call.

5. The method of claim 4, further comprising joining the second endpoint and the public safety access point to a break-out session of the conference call.

6. The method of claim 5, further comprising joining the first endpoint to the break-out session.

7. The method of claim 1, wherein the other endpoint is not joined to the conference call.

8. The method of claim 7, wherein identifying the other endpoint that is logged into the communication service and that is proximate to the location of the second endpoint further comprises determining that the other endpoint is in a same building as the second endpoint.

9. A computing device comprising:

one or more computer-readable storage media;

one or more processors operatively coupled with the one or more computer-readable storage media; and a collaboration application comprising program instructions stored on the one or more computer-readable storage media that, when executed by the one or more processors, direct the computing device to at least:

join a conference call hosted by a communication service;

exchange bidirectional communications with one or more other endpoints on the conference call;

receive, via a user interface of the collaboration application, a first user input comprising a selection of a second endpoint of the one or more other endpoints on the conference call;

receive, via the user interface of the collaboration application, a second user input indicative of an instruction to request emergency service on behalf of a user at the second endpoint;

in response to the second user input, send a request, to the communication service, for emergency service on behalf of the user at the second endpoint; and enable display of a notification of the request for emergency service in the user interface of the collaboration application.

10. The computing device of claim 9, wherein to send the request for emergency service, the program instructions direct the computing device to place an emergency call to a public safety access point using a location of the second endpoint.

11. The computing device of claim 10, wherein the emergency call is joined to the conference call.

12. The computing device of claim 11, wherein the emergency call is joined to a break-out session of the conference call.

13. The computing device of claim 10, the program instructions further comprising requesting the location of the second endpoint from the second endpoint.

14. The computing device of claim 9, wherein to send the request for emergency service, the program instructions direct the computing device to send the request to the communication service using a location of the second endpoint.

15. A communication system comprising:

one or more computer readable storage media;

one or more processors operatively coupled with the one or more computer readable storage media; and program instructions stored on the one or more computer readable storage media that, when executed by the one or more processors, direct the communication system to at least:

host a conference call comprising bidirectional communications between at least a first endpoint and a second endpoint;

receive, in a context of the conference call, a request from the first endpoint for emergency service on behalf of a user at the second endpoint, wherein the request is initiated by user input received at a user interface on the first endpoint;

establish a connection between the second endpoint and a public safety access point to obtain the emergency service for the user;

identify another endpoint that is logged into the communication system and that is proximate to a location of the second endpoint; and send an alert of the request for emergency service to the other endpoint.

16. The communication system of claim 15, wherein to establish the connection, the program instructions direct the communication system to direct the second endpoint to call the public safety access point.

17. The communication system of claim 15, wherein to establish the connection, the program instructions direct the communication system to connect to the public safety access point when a timer on a notification on the second endpoint expires, wherein the notification comprises an indication that the request for emergency service has been initiated.

18. The communication system of claim 17, wherein the program instructions further direct the communication system to add the public safety access point to the conference call.

19. The communication system of claim 18, wherein the program instructions further direct the communication system to join the second endpoint and the public safety access point to a break-out session of the conference call.

20. The communication system of claim 19, wherein the program instructions further direct the communication system to join the first endpoint to the break-out session.

21. The communication system of claim 15, wherein the other endpoint is not joined to the conference call.

* * * * *